June 12, 1934.   F. H. WAGNER, JR   1,962,884
CONTROL MECHANISM FOR HEATING AND VENTILATING
Filed Jan. 25, 1932   3 Sheets-Sheet 2
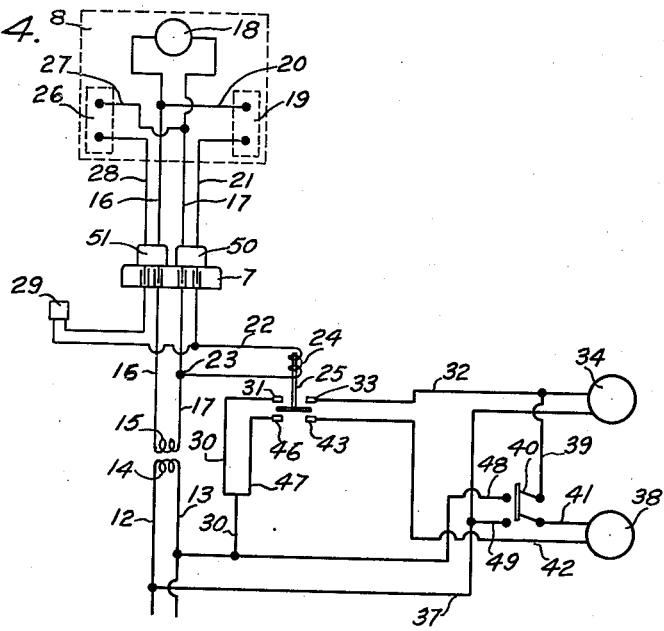
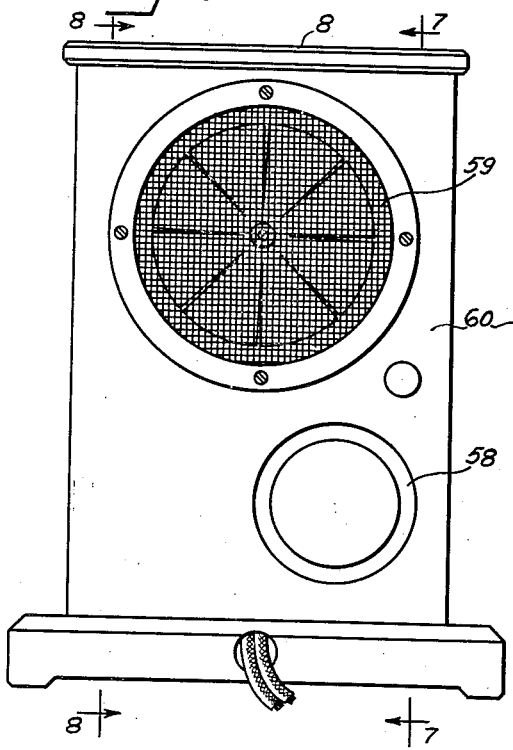
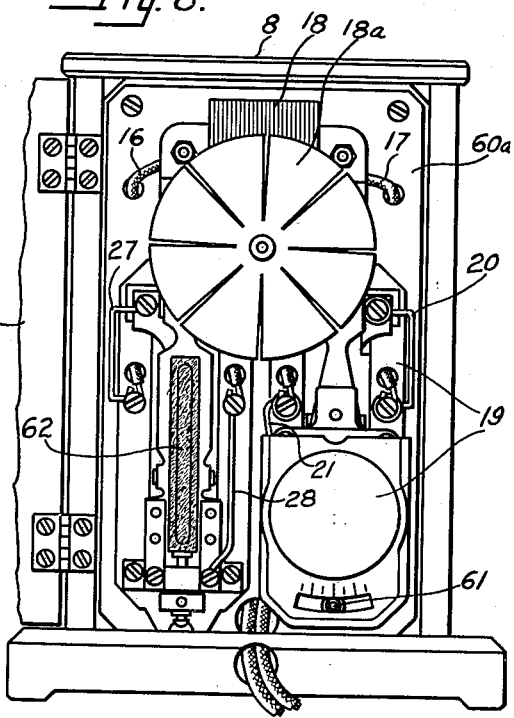
INVENTOR
FREDERICK H. WAGNER JR.
BY
ATTORNEY June 12, 1934. F. H. WAGNER, JR 1,962,884
CONTROL MECHANISM FOR HEATING AND VENTILATING
Filed Jan. 25, 1932   3 Sheets-Sheet 3

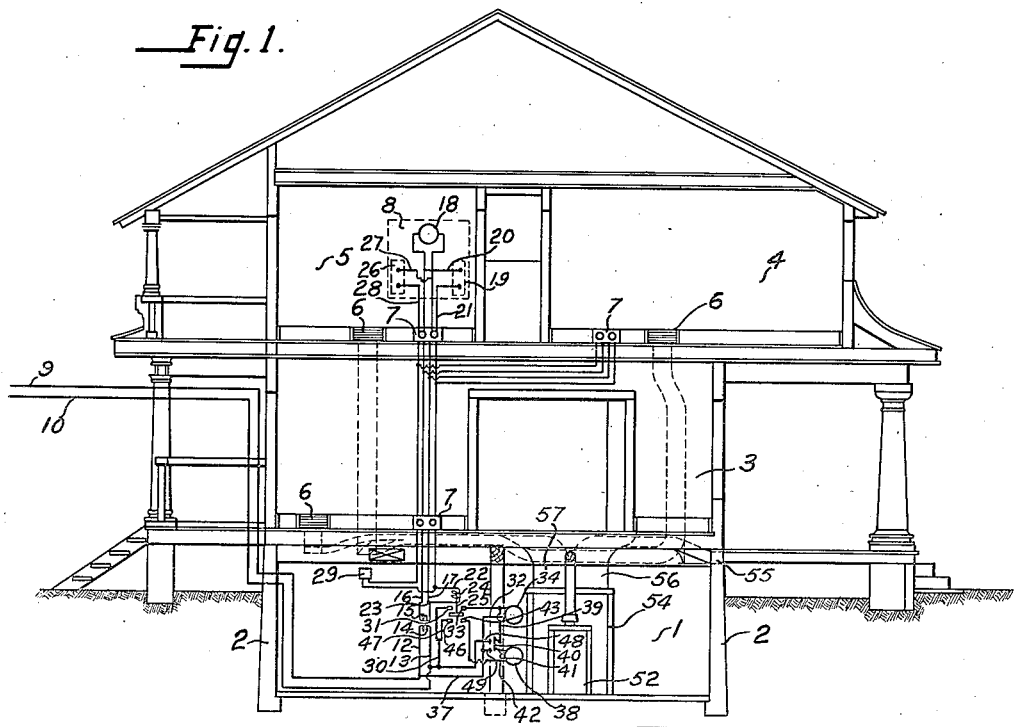

INVENTOR
FREDERICK H. WAGNER JR.
BY
ATTORNEY

Patented June 12, 1934

1,962,884

UNITED STATES PATENT OFFICE 1,962,884

CONTROL MECHANISM FOR HEATING AND VENTILATING

Frederick H. Wagner, Jr., Detroit, Mich., assignor to American Blower Corporation, Detroit, Mich., a corporation of Delaware Application January 25, 1932, Serial No. 588,673

4 Claims. (Cl. 236—44)

This invention relates to a control system and apparatus therefor and a method of control of the temperature and humidity of a plurality of enclosures.

In the ordinary type of building, particularly a dwelling, it has heretofore been the standard practice in the art of controlling the temperature of the interior of the dwelling to establish at some permanent central location a theremostatic control for the heating apparatus which is located in the cellar. The difficulty with such an arrangement has been that it is at best arbitrary; it is permanently fixed and cannot be changed; the shifting of the wind changes the conditions under which the thermostatic control must operate and frequently leaves the thermostatic control in a very disadvantageous position.

Furthermore, in the dwelling, it may be necessary to maintain the temperature in one of the rooms, as in the case of sickness, at some predetermined temperature irrespective of the rest of the house, which is impossible to successfully accomplish if the thermostat is located at some remote point other than the room whose temperature is to be controlled.

In other words, the present system of thermostatic control of a heating apparatus for a dwelling or other type of building is inflexible.

It is further difficult to determine the exact place of installation and its location must be more or less a matter of guess work and hazardous.

This invention contemplates a method and apparatus for control of both temperature and humidity in a plurality of rooms by providing a single unitary system available in every room with a portable control for humidity and temperature detachably attached to any outlet in any room, so that the master control system can be operated from any room and from any place in the system.

It is a further object to provide means of thus controlling, when an air conditioning system is employed, the operation of a blower and the operation of a pump, one or both, in connection with the circulation of the air and the circulation of either refrigerant or radiator medium, or any number of different items involved in air conditioning and in heating and ventilating. Any number or combination of instrumentalities for such a purpose may be controlled by this invention through wiring every room for connection therewith and providing a portable control box or set of instruments which can be plugged into the system in any one of the rooms supplied by the system. As the heating and ventilating apparatus or air conditioning apparatus thus controlled has conduits or other equivalent apparatus communicating with each of the rooms, a perfect interlocking system is thus secured.

For instance, this portable control box of instruments can control the temperature within less than one degree variation during the heating season and retain a relative humidity desired during the heating season. These figures are based upon practical experience with the system.

Likewise, perfect conditions can be secured in summer time with the air conditioning apparatus for maintaining the temperature and humidity within the dwelling by locating the control instruments in any one of the rooms in the dwelling.

Referring to the drawings:

Figure 1 is a section through a typical dwelling showing the installation of the wiring system, heating and ventilating system and the connection therebetween;

Figure 2 is a plan view of the cellar arrangement showing the installation of the wiring system and of the heating, ventilating and air conditioning system;

Figure 3 is an electrical diagram showing one form of the wiring connections where only a single motor is used;

Figure 4 shows the preferred form of wiring where a fan, motor and pump motor are employed, or one only may be employed;

Figure 5 is a front elevation of the portable control cabinet;

Figure 6 is a front elevation thereof with the door open;

Figure 7:
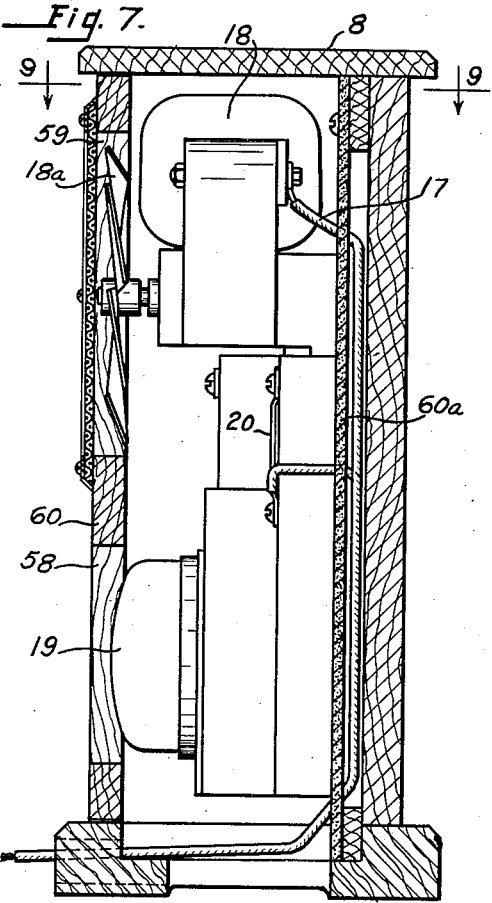
Figure 7 is a section on the line 7—7 of Figure 5 looking in the direction of the arrows.
Figure 8:
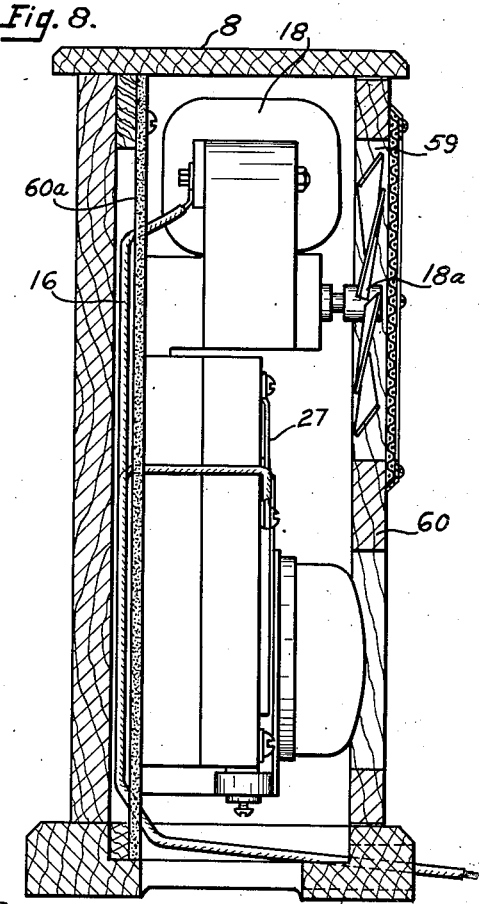
Figure 8 is a section on the line 8—8 of Figure 5 looking in the direction of the arrows.
Figure 9:
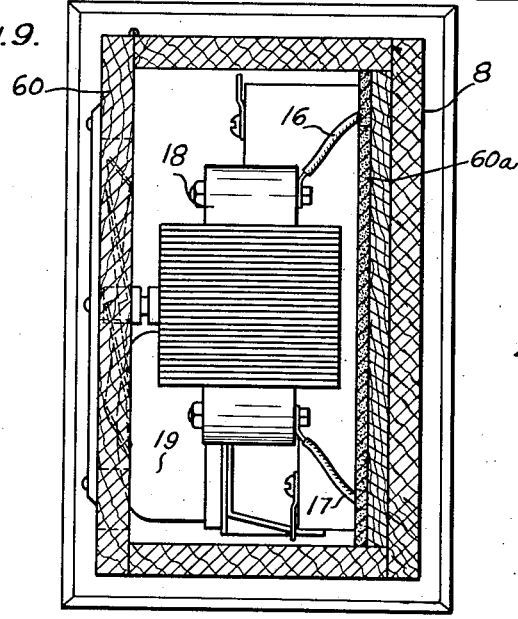
Figure 9 is a section on the line 9—9 of Figure 7 looking in the direction of the arrows.
Figure 10:
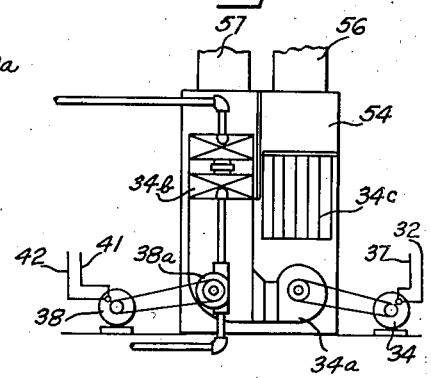
Figure 10 is a diagrammatic view of a typical air conditioning cabinet which may be employed successfully with this system.

Referring to the drawings in detail, 1 indicates a cellar of a dwelling, such cellar being formed by the cellar walls 2. Mounted on these walls is a plurality of closures constituting rooms, designated 3, 4 and 5. In each room is an outlet grille 6 in the baseboard, through which properly heated or cooled, filtered and conditioned air suitably humidified may be delivered into the enclosures, such as 3, 4 and 5. In the baseboard, or in any other suitable location, is mounted an outlet plug 7 which constitutes the point at which the wires of an instrument box, generally designated 8, may be plugged in that particular room so that the temperature and humidity of the system may be controlled from that room according to the temperature and humidity in that room or its associated rooms in communication therewith.

Power lines 9 and 10 are conveyed into the dwelling in the usual manner, preferably into the cellar, such power lines terminating in a loop having arms 12 and 13 and an interconnecting coil 14 forming one part of a transformer coil, the other half of which is designated 15, whereby voltage, such as 110 volts, is transformed into 24 volts in the circuit comprising the lines 16 and 17 inclusive of the coil 15. In this circuit is an electric motor 18 which operates a fan 18a. Within the control box 8 is located a thermostat 19 connected by the wire 20 to the wire 16 on one side and by the wire 21 on the other side to the wire 22 which in turn is connected at 23 to the wire 17 having inserted in it a solenoid coil 24 for operating the solenoid contact member 25. The humidostat 26 is connected by the wire 27 to the wire 17 on one side and by the wire 28 through the solenoid valve 29 to the wire 22. The closing of the circuit by either the thermostat 19 or the humidostat 26 results in closing the solenoid valve contact member 25, and will close the fan circuit or motor circuit, or both, as hereinafter explained.

The wire 13 is provided with a line 30 which terminates at 31, while a wire 32 having the terminal 33 is connected to the fan motor 34. The wires 30 and 32 are connected by the contact member 25.

In Figure 3 there is provided a shunt line 35 controlled by the switch 36 which is closed only in summer time but is open during winter operation.

The fan motor 34 is connected by the wire 37 back to the line 12 as this motor operates off the 110 volt line.

As will be seen in Figure 4, an additional motor, such as a pump motor, may be employed for use during summer operation to circulate refrigerant or radiator medium, such motor being designated 38 and controlled by the thermostat 19. Accordingly, a wire 39 is connected to one side of a two-pole switch 40, the other side of which at 41 is connected to the motor 38. The motor 38 has another connection 42 extending over to a terminal member 43 which is bridged through the contact member 25 to a terminal 46 of a wire 47. The two-pole switch is adapted to be connected for the wire 48 and a wire 49. When this switch is closed, as during summer time, the pump motor will operate. When the switch 40 is closed the fan will operate continuously. The solenoid valve 29 is adapted to control the humidity mechanism, such as a water injector which injects water over the heating radiators to humidify the air being delivered to the plurality of enclosures in the dwelling.

In order that the control box 8 with the humidostat and thermostat may be moved from room to room, it being shown in Figure 1 plugged in the room 5, the four wires 21, 17, 16 and 28 may be made in two sections connected together by using the plugs 50 and 51 in the receptacle 7 as indicated in Figure 4 as well as Figure 3.

Consequently, the control instrument may be moved from room to room depending upon the demands of the household or the conditions of the outside temperature, humidity, direction of the wind, etc.

It is thus possible to employ successfully a hot air heating system without the difficulties usually inherent in such a system of having the direction of the wind make it impossible to heat certain rooms, as the heated air cannot be driven against the wind pressure that leaks into the rooms on the windy side of the dwelling.

In the installation shown herein, it will be noted that a boiler 52 connected by the pipes 53 to an air conditioning apparatus 54 has been provided. For instance, outside air may be introduced through the inlet vents 55 into a piping system 56 which communicates with the casing 54 to an air conditioning apparatus that has a blower operated by a motor 34 and a radiator heated by the boiler 52 or cooled by some equivalent refrigeration means, the exact nature of which is not important in the present connection.

Also, moisture may be injected, as controlled by the solenoid valve 29, into the enclosure through which the heated or cooled air is being passed by the blower operated by the motor 34. Different applications of this invention may be applied without disturbing its principle. The air thus treated is delivered through the outlet piping system 57 for delivery of the air through the various vents 6 into the respective rooms of the dwelling.

It is thus possible by a single portable control instrument to control the humidity temperature of the entire heating, ventilating and air conditioning system for either heating or cooling and regulating the humidity of the enclosures within the dwelling.

In order to facilitate accurate control, the fan 18a has been provided in order to circulate air through the port 58 and grille 59 in the door 60 of the cabinet 8.

This circulation of air over the instruments, such as the humidostat and the thermostat, insures accurate regulation in that the air in the room is constantly circulating over the instruments and the instruments are not affected by abnormal conditions of the air in some remote portion of the room.

Then too it has been found that, by using with this method of control and apparatus, air circulating means, such as a blower operated by the motor 34 through the system of pipes 57, there being means to return the air through the damper 56a from the boiler room of the dwelling, this constant circulation of air, even the heat treated and humidified, in combination with the portable control instrument, particularly the air circulation going through the portable control instrument, makes it possible to accurately control the temperature and humidity of all the rooms of the building when the doors therebetween are open and to compensate for any special conditions of outside temperature, wind direction, etc. by properly locating the control instruments in the box 8 by plugging in the instrument into the system in a suitable room.

The exact details of the thermostat and humidostat are not of importance in connection with this invention. The usual temperature setting means 61 is provided in the thermostat 19. The usual moisture apparatus 62 is provided in the humidostat 26.

The humidostat, thermostat and electric motor may be mounted upon the panel 60a, such panel being of insulating material.

The air conditioning cabinet 54 has a blower 34a supplying air over the heating or cooling radiators 34b, which air has been passed through the filter bags 34c. The radiators may be supplied with liquid from the pump 38a.

The cabinet 8 for these instruments is small, is preferably formed of decorative materials and being thus decorative and inconspicuous can be placed in any desired place in a room without detracting from the appearance of the room. It can be located, by reason of its wires and the length thereof from the plugs 51, at any distance from the receptacle 7 from the walls of the room.

It will be understood that I desire to comprehend within my invention such modifications as may be necessary to adapt it to varying conditions and uses.

Having thus fully described my invention, what I claim as new and desire to secure by Letters Patent, is:

1. In a system of heating and ventilating adapted to control the temperature and humidity of air in a plurality of enclosures, a common means for supplying air of the proper temperature and humidity to each of said enclosures, electrical means for operating said supplying means, a main electric circuit for operating said electrical means, a control circuit supplied with current thereby adapted to open and close the main operating circuit for the air supply means, said control circuit extending to and having outlets in some of the several enclosures so supplied, and a portable means for regulating said control circuit adapted to be plugged into said circuit in any one of said enclosures so supplied.

2. In a system of heating and ventilating adapted to control the temperature and humidity of air in a plurality of enclosures, a common means for supplying air of the proper temperature and humidity to each of said enclosures, electrical means for operating said supplying means, a main electric circuit for operating said electrical means, a control circuit supplied with current thereby adapted to open and close the main operating circuit for the air supply means, said control circuit extending to and having outlets in some of the several enclosures so supplied, and a portable means for regulating said control circuit adapted to be plugged into said circuit in any one of said enclosures so supplied, said portable control means comprising a humidostat and a thermostat.

3. In a system of heating and ventilating adapted to control the temperature and humidity of air in a plurality of enclosures, a common means for supplying air of the proper temperature and humidity to each of said enclosures, electrical means for operating said supplying means, a main electric circuit for operating said electrical means, a control circuit supplied with current thereby adapted to open and close the main operating circuit for the air supply means, said control circuit extending to and having outlets in some of the several enclosures so supplied, and a portable means for regulating said control circuit adapted to be plugged into said circuit in any one of said enclosures so supplied, said portable control means comprising a humidostat and a thermostat, and electrically-operated means for circulating air from the enclosure to and from said humidostat and thermostat.

4. In a system of heating and ventilating comprising means to control the temperature of air, means to humidify the air and means to blow the tempered and humidified air to a plurality of enclosures, and electrically-operated means for blowing said air and electrically-operated means for regulating the temperature of the air so blown, and electrically-operated means for controlling the humidity of the air, a main electric circuit for operating the air supply and temperature control electrical means, a control circuit associated therewith and supplied with current therefrom extending to some of the enclosures so supplied having means therein for operating the humidity controlling means, switch means operated by said control circuit for controlling the operation of the main circuit, and a portable thermostat and humidostat means adapted to be plugged into said control circuit in any one of the enclosures so supplied and for controlling the entire system from the point where the portable thermostat and humidostat have been so plugged in.

FREDERICK H. WAGNER, Jr.